(12) United States Patent
Sampath

(10) Patent No.: US 11,375,042 B2
(45) Date of Patent: Jun. 28, 2022

(54) SYMPHONIZING SERVERLESS FUNCTIONS OF HYBRID SERVICES

(71) Applicant: KYNDRYL, INC., New York, NY (US)

(72) Inventor: Kuricheti Venkata Lakshmi Sai Sampath, Bangalore (IN)

(73) Assignee: KYNDRYL, INC., New York, NY (US)

(*) Notice: Subject to any disclaimer, the term of this patent is extended or adjusted under 35 U.S.C. 154(b) by 0 days.

(21) Appl. No.: 16/925,660

(22) Filed: Jul. 10, 2020

(65) Prior Publication Data
US 2022/0014602 A1 Jan. 13, 2022

(51) Int. Cl.
| | | |
|---|---|---|
| H04L 29/08 | (2006.01) | |
| H04L 29/06 | (2006.01) | |
| H04L 5/00 | (2006.01) | |
| G06F 15/16 | (2006.01) | |
| H04L 12/24 | (2006.01) | |
| G06F 9/455 | (2018.01) | |
| H04L 12/26 | (2006.01) | |

(Continued)

(52) U.S. Cl.
CPC ........ H04L 67/322 (2013.01); H04L 63/0272 (2013.01); H04L 63/20 (2013.01); H04L 67/10 (2013.01)

(58) Field of Classification Search
CPC ... H04L 67/322; H04L 63/20; H04L 63/0272; H04L 67/10
USPC ......................................................... 709/223
See application file for complete search history.

(56) References Cited

U.S. PATENT DOCUMENTS 9,607,058 B1 * 3/2017 Gupta .................... G06F 16/93
10,764,244 B1 * 9/2020 Mestery .............. G06F 9/45558

(Continued)

FOREIGN PATENT DOCUMENTS

| CN | 101637006 | 1/2010 |
|---|---|---|
| EP | 2697992 A2 | 2/2014 |

(Continued)

OTHER PUBLICATIONS

"Method and System for Optimizing Server-less Execution Environment for Cloud Service Providers", ip.com Prior Art Database Technical Disclosure, Disclosed Anonymously, IPCOM000257744D, Mar. 7, 2019, 2 pages.

(Continued)

*Primary Examiner* — David R Lazaro
*Assistant Examiner* — Berhanu Shitayewoldetadik
(74) *Attorney, Agent, or Firm* — Ken Han; Andrew M. Calderon; Roberts Calderon Safran & Cole, P.C.

(57) ABSTRACT

In an approach to defining and symphonizing serverless functions of hybrid multi-cloud services, a mapping table that contains quality of service (QoS) attributes for applications and service providers is created. Responsive to receiving a request from a runtime application to access specific serverless functions, specific QoS attributes for the runtime application are determined. Supporting service providers that provide the specific serverless functions and the specific QoS attributes for the runtime application are determined. A supporting service provider is selected from the supporting service providers. The specific serverless functions for the runtime application are bound to the supporting service provider.

17 Claims, 9 Drawing Sheets

(51) Int. Cl.
*G06F 16/28* (2019.01)
*H04L 67/61* (2022.01)
*H04L 9/40* (2022.01)
*H04L 67/10* (2022.01)

(56) References Cited

U.S. PATENT DOCUMENTS

| | | | | |
|---|---|---|---|---|
| 10,782,934 | B1* | 9/2020 | Chawda | G06F 8/30 |
| 10,938,650 | B1* | 3/2021 | Hermoni | H04L 43/067 |
| 10,951,779 | B1* | 3/2021 | Diasti | H04L 67/02 |
| 10,986,184 | B1* | 4/2021 | Seymour | H04L 67/12 |
| 11,018,965 | B1* | 5/2021 | Ibryam | H04L 41/0896 |
| 11,153,106 | B2* | 10/2021 | Barrett | H04L 12/1407 |
| 2010/0100525 | A1* | 4/2010 | Huang | H04L 67/02 |
| | | | | 707/769 |
| 2012/0102170 | A1* | 4/2012 | Hiltunen | H04L 67/16 |
| | | | | 719/328 |
| 2012/0284382 | A1 | 11/2012 | Aboualy et al. | |
| 2018/0113793 | A1* | 4/2018 | Fink | G06F 11/362 |
| 2018/0115551 | A1* | 4/2018 | Cole | H04L 63/083 |
| 2018/0270301 | A1* | 9/2018 | Zhang | G06F 9/44 |
| 2019/0028552 | A1* | 1/2019 | Johnson, II | H04L 67/02 |
| 2019/0075154 | A1* | 3/2019 | Zhang | G06F 9/5072 |
| 2019/0149480 | A1* | 5/2019 | Singhvi | H04L 47/24 |
| | | | | 709/226 |
| 2019/0163754 | A1* | 5/2019 | Huang | G06F 16/182 |
| 2019/0205186 | A1* | 7/2019 | Zhang | G06F 9/4881 |
| 2019/0251279 | A1* | 8/2019 | Emberson | G06F 21/602 |
| 2019/0261203 | A1* | 8/2019 | Raleigh | H04L 12/1407 |
| 2019/0287208 | A1* | 9/2019 | Yerli | G06N 20/10 |
| 2019/0332366 | A1* | 10/2019 | Natanzon | G06F 11/3696 |
| 2019/0340032 | A1 | 11/2019 | Ganteaume | |
| 2020/0007414 | A1* | 1/2020 | Smith | H04L 67/12 |
| 2020/0097310 | A1* | 3/2020 | Shukla | G06F 9/5072 |
| 2020/0127908 | A1* | 4/2020 | Ribenzaft | G06F 11/3404 |
| 2020/0351345 | A1* | 11/2020 | Bansod | G06F 11/1464 |
| 2020/0394709 | A1* | 12/2020 | Cella | G06K 9/6218 |
| 2021/0044501 | A1* | 2/2021 | Nalluri | H04L 41/5009 |
| 2021/0089358 | A1* | 3/2021 | Yeung-Rhee | G06F 21/64 |
| 2021/0092062 | A1* | 3/2021 | Dhanabalan | H04L 47/805 |
| 2021/0096882 | A1* | 4/2021 | Miller | G06F 16/188 |
| 2021/0099459 | A1* | 4/2021 | Zhang | H04L 63/105 |
| 2021/0133670 | A1* | 5/2021 | Cella | G06N 5/04 |
| 2021/0157623 | A1* | 5/2021 | Chandrashekar | G06F 9/45558 |
| 2021/0168779 | A1* | 6/2021 | Mondal | H04W 72/10 |
| 2021/0194913 | A1* | 6/2021 | Hecht | H04L 63/105 |
| 2021/0306412 | A1* | 9/2021 | Padiyar | G06F 9/5072 |
| 2021/0377735 | A1* | 12/2021 | Latour | H04W 12/108 |

FOREIGN PATENT DOCUMENTS

| | | | | |
|---|---|---|---|---|
| KR | 20180034618 A * | 4/2018 | | H04W 4/80 |
| WO | 0193121 | 12/2001 | | |
| WO | WO-2008111884 A1 * | 9/2008 | | H04L 67/02 |
| WO | WO-2018185531 A1 * | 10/2018 | | G06F 9/5005 |
| WO | WO-2019168715 A1 * | 9/2019 | | G06F 9/4843 |
| WO | WO-2020096639 A1 * | 5/2020 | | G06F 11/302 |
| WO | WO-2021092263 A1 * | 5/2021 | | G06F 16/283 |

OTHER PUBLICATIONS

Fox, "Status of Serverless computing and function-as-a Service (FaaS) in Industry and Research", Whitepaper, First International Workshop on Serverless computing (WoSC) 2017, Aug. 27, 2017, pp. 1-22, <arXiv.org>cs>arXiv, 1708.08028>.

Hinkle, "Serverless Lock-in, How to Avoid it", Triggermesh, Jan. 18, 2020,<https://triggermesh.com/2019/01/serverless-lock-in-how-to-avoid-it/>.

Lai et al., "A Nework and Device Aware QoS Approach for Cloud-Based Mobile Streaming", IEEE Transactions on Multimedia, vol. 15, No. 4, Jun. 2013, 11 pages.

Mell et al., "The NIST Definition of Cloud Computing", National Institute of Standards and Technology, Special Publication 800-145, Sep. 2011, 7 pages.

Rai et al., "Method for dynamically binding to lambda style functions at runtime based upon intent, policy and context within a serverless compute environment" ip.com Prior Art Database Technical Disclosure, IPCOM000253529D, Apr. 6, 2018, 15 pages.

Sampath KVL, "GTM1_Patent," Method to define and symphonize serverless functions of hybrid multi-cloud services, PPT Presentation, Sep. 23, 2019, pp. 1-11.

Sbarski, "The essential guide to serverless technologies and architectures", App Dev & Testing DevOps Enterprise IT Security, Feb. 17, 2020, pp. 1-13, <https://techbeacon.com/enterprise-it/essential-guide-serverless-technologies-architectures>.

International Search Report and Written Option of the International Searching Authority from PCT Application No. PCT/CN2021/099264 dated Sep. 9, 2021, 9 pages.

* cited by examiner

SYMPHONIZING SERVERLESS FUNCTIONS OF HYBRID SERVICES

BACKGROUND

The present invention relates generally to the field of network-based applications, and more particularly to defining and symphonizing serverless functions of hybrid multi-cloud services.

Hybrid cloud is a computing environment that connects on-premises private cloud services of an organization with third-party public cloud services into a single, flexible infrastructure for running applications and workloads. The principle behind hybrid cloud is that the mix of public and private cloud resources gives an organization the flexibility to choose the optimal cloud for each application or workload. It also allows the organization to move workloads freely between the two clouds as circumstances change. This enables the organization to meet its technical and business objectives more effectively and cost-efficiently than it could with public or private cloud alone.

Serverless computing is a cloud computing execution model in which the cloud provider runs the server, and dynamically manages the allocation of machine resources. Hence, the model is not actually serverless; the name indicates that the servers are managed by the cloud provider. More specifically, a cloud provider runs physical servers and dynamically allocates their resources on behalf of a user. Serverless computing can simplify the process of deploying code into production, because scaling, capacity planning and maintenance operations may be hidden from the developer. Serverless code can also be used in conjunction with code deployed in traditional styles, or alternatively, applications can be written to be purely serverless and use no provisioned servers at all.

Function-as-a-Service (FaaS) is an option for deploying applications in the cloud. In FaaS, developers write custom server applications, but they are run in containers fully managed by a cloud provider. Either an entirely serverless application or an application of partially serverless and partially traditional microservices components can be constructed through this method. Once written, it is deployed into containers that are managed by a cloud provider, which is the primary benefit of serverless.

SUMMARY

Embodiments of the present invention disclose a method, a computer program product, and a system for symphonizing serverless functions of hybrid multi-cloud services. In one embodiment, a mapping table that contains quality of service (QoS) attributes for applications and service providers is created. Responsive to receiving a request from a runtime application to access specific serverless functions, specific QoS attributes for the runtime application are determined. Supporting service providers that provide the specific serverless functions and the specific QoS attributes for the runtime application are determined. A supporting service provider is selected from the supporting service providers. The specific serverless functions for the runtime application are bound to the supporting service provider.

DETAILED DESCRIPTION

Figure 1:
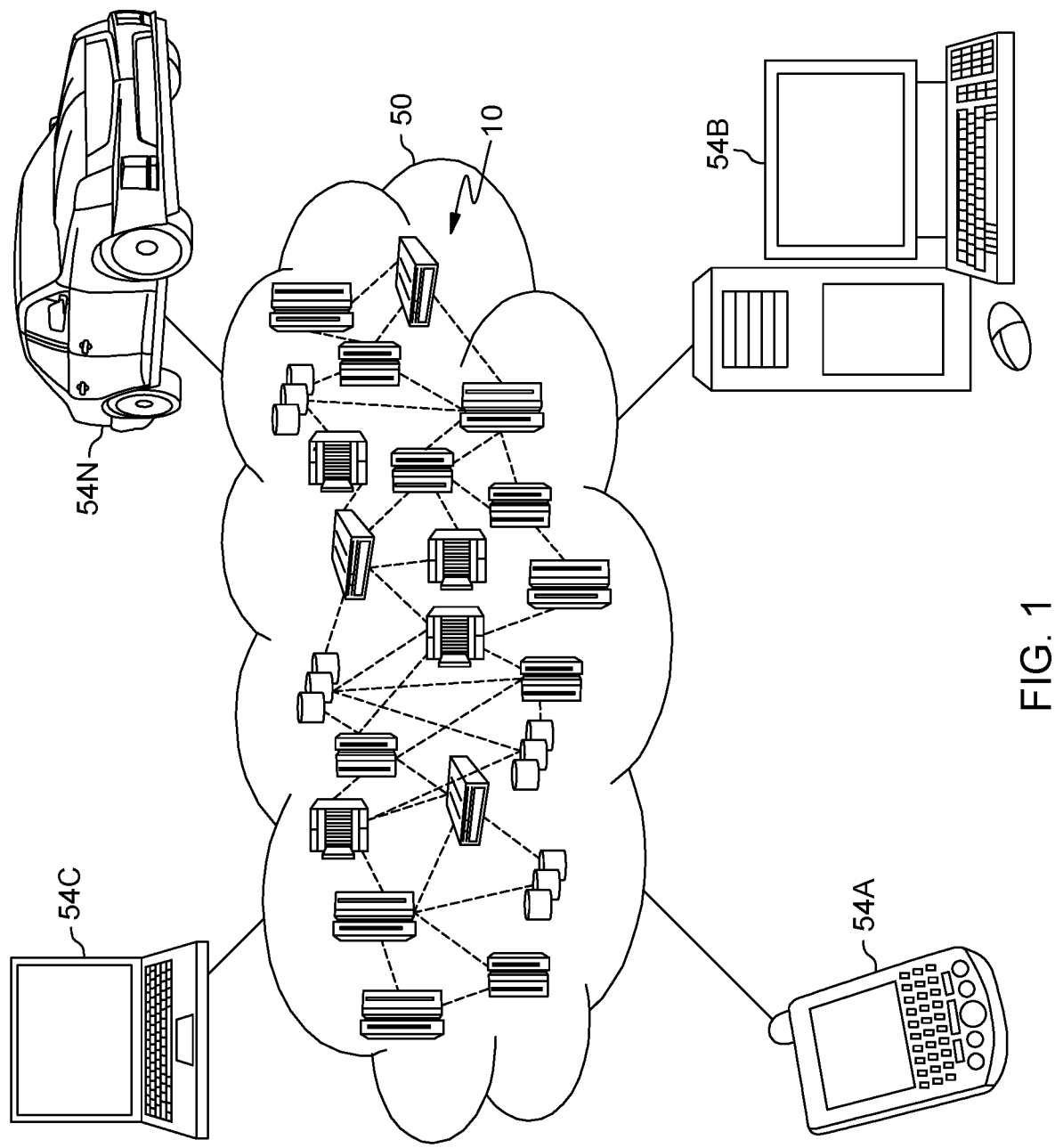
FIG. 1 depicts a cloud computing environment according to an embodiment of the present invention.

No mechanism currently exists to abstract and symphonize serverless functions distributed across multi-clouds. A multi-cloud solution is one where an organization uses multiple different public cloud services, often from multiple different providers. Hybrid multi-cloud services are bound to specific cloud provider serverless functions. Therefore, they require an automation standard to switch serverless functions across multi-clouds during runtime and attain a hybrid cloud service definition that can run across different cloud providers. The present invention will avoid binding to a serverless function of a multi-cloud system. Instead, the cloud service optimization attributes of the present invention are used to classify, qualify, and determine specific serverless functions during runtime.

The problem in the current art is the increasing number of multi-cloud serverless components that are similar to client-defined legacy functions. Clients want to symphonize these services during runtime, thereby reducing the total cost of ownership and eliminating specific cloud provider integration standards. In the present invention, applications will define the required functions by providing the input and the quality attributes for those functions. A serverless context will be created during runtime according to the required quality attributes and supported serverless functions. The application will leverage hybrid cloud services defined using serverless functions.

In the case of leveraging the same function but with different quality attributes, the same hybrid cloud service generates a different serverless context for the corresponding cloud provider supporting the required quality attributes. Quality attributes will define the hybrid cloud service definition during runtime. This approach generates a hybrid multi-cloud runtime for serverless functions. These quality identifiers for serverless services are based on open standards to allow hybrid cloud services to leverage these standards during runtime.

The present invention has a single interface for multi-cloud serverless functions based on quality attributes mapped to the service rather than the current approach of binding to serverless components. The present invention avoids the burden of performing manual evaluation of serverless computing features and qualities from particular multi-clouds associated with a particular service or function implementation, or to build a particular library for each implementation. Instead, the present invention represents a method, computer program product, and system to transform serverless computing for silos into fully interoperable multi-cloud serverless computing.

The present invention is based on a symphonized and interoperable hybrid multi-cloud serverless mechanism. This approach utilizes a multi-cloud serverless hybrid cloud service module, in which QoS attributes will be mapped in a table to determine the appropriate runtime for the service consumers. The mapping table is used to automate the selection of the appropriate cloud service provider for each runtime service.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
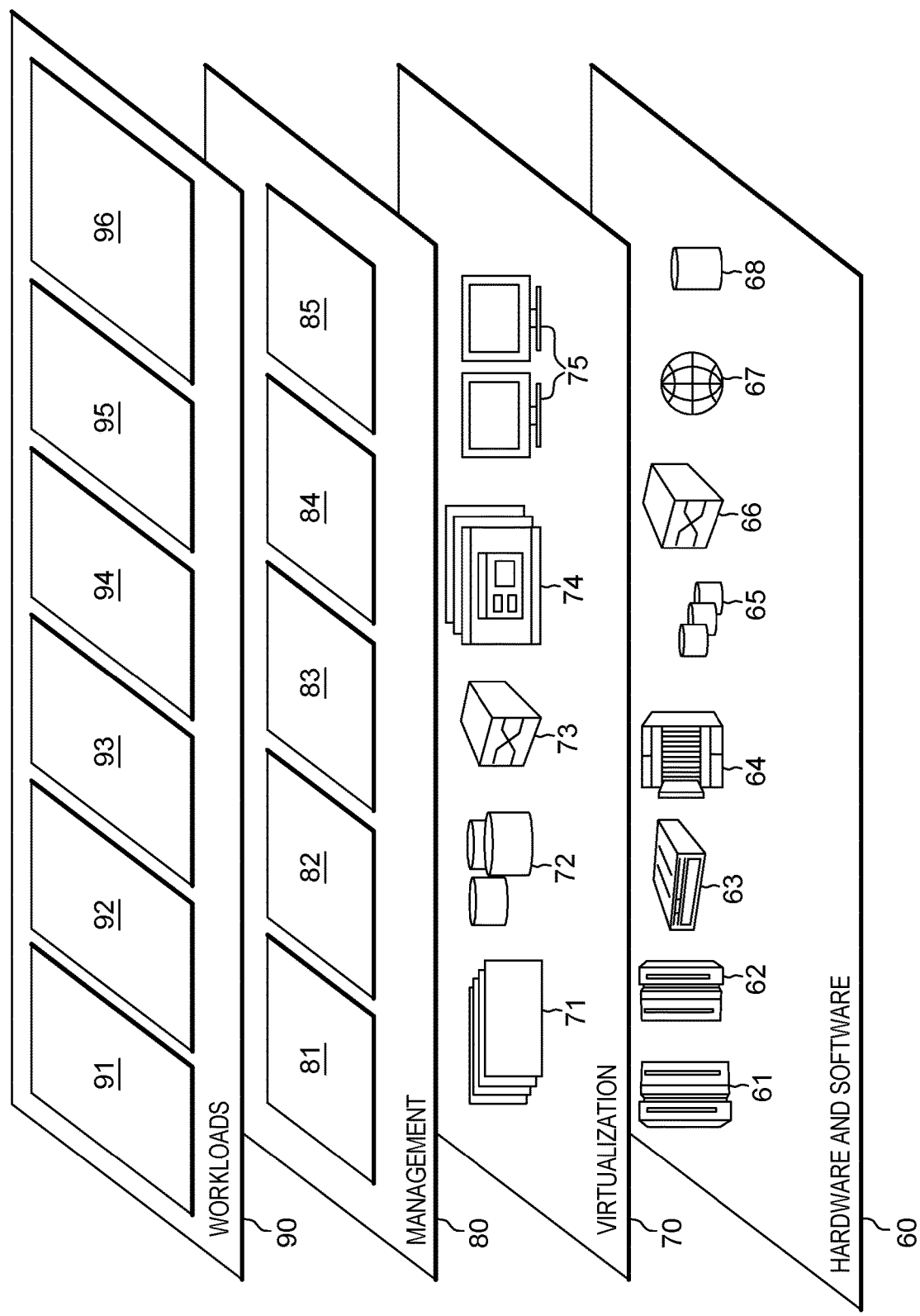
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
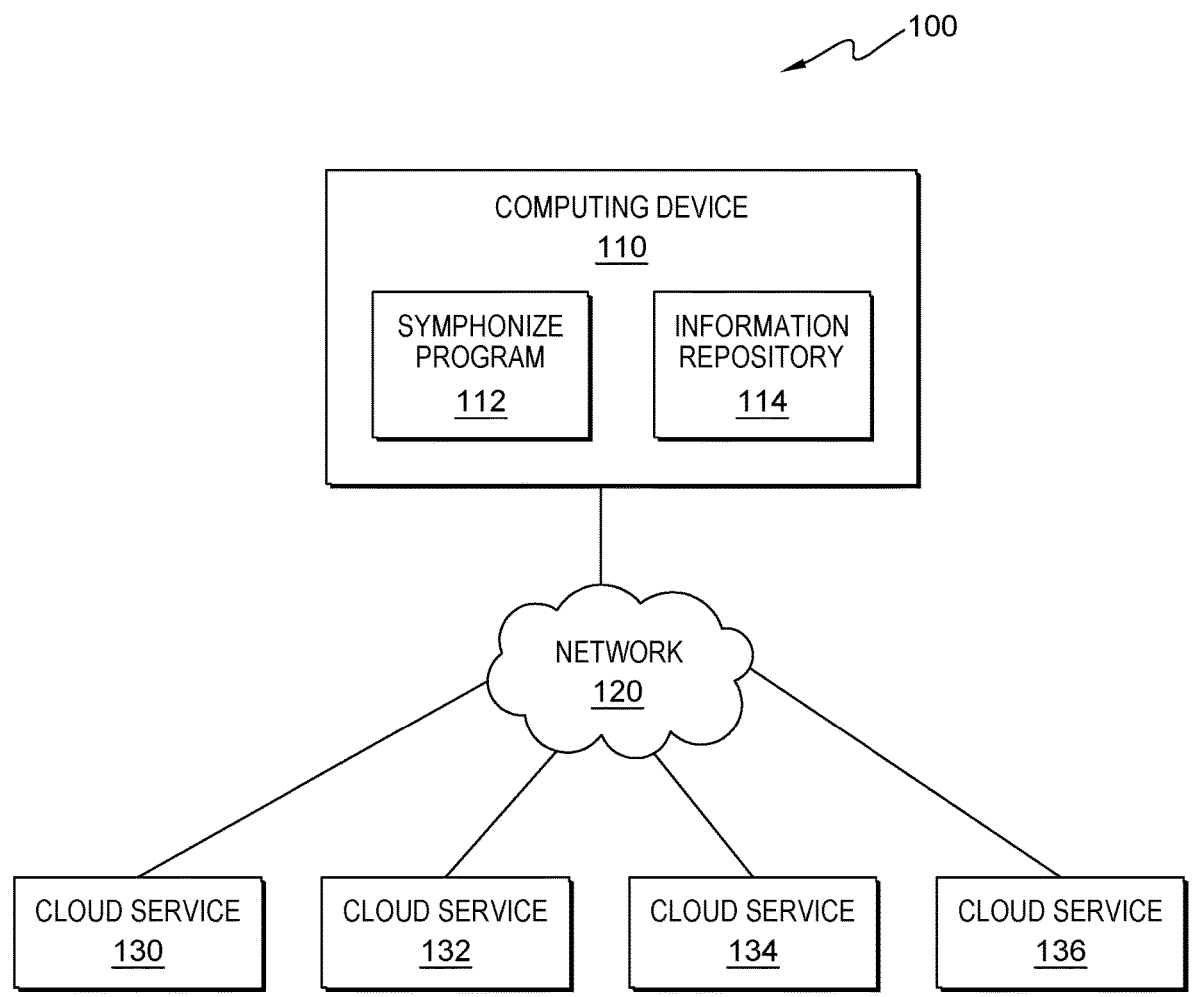
FIG. 3 is a functional block diagram illustrating a distributed data processing environment, in accordance with an embodiment of the present invention.

FIG. 3 is a functional block diagram illustrating a distributed data processing environment, generally designated 100, suitable for operation of symphonize program 112 in accordance with at least one embodiment of the present invention. The term "distributed" as used herein describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, and cloud services 130, 132, 134, and 136, all connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, cloud services 130, 132, 134, and 136, and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes symphonize program 112. In an embodiment, symphonize program 112 is a program, application, or subprogram of a larger program for defining and symphonizing serverless functions of hybrid multi-cloud services. In an alternative embodiment, symphonize program 112 may be located on any other device accessible by computing device 110 via network 120.

In an embodiment, computing device 110 includes information repository 114. In an embodiment, information repository 114 may be managed by symphonize program 112. In an alternate embodiment, information repository 114 may be managed by the operating system of the device, alone, or together with, symphonize program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, application data, cloud configuration data, user data, system configuration data, and other data that is received by symphonize program 112 from one or more sources, and data that is created by symphonize program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

In an embodiment, computing device 110 includes cloud services 130, 132, 134, and 136. In an embodiment, cloud services 130, 132, 134, and 136 are providers of hybrid cloud services.

Figure 4:
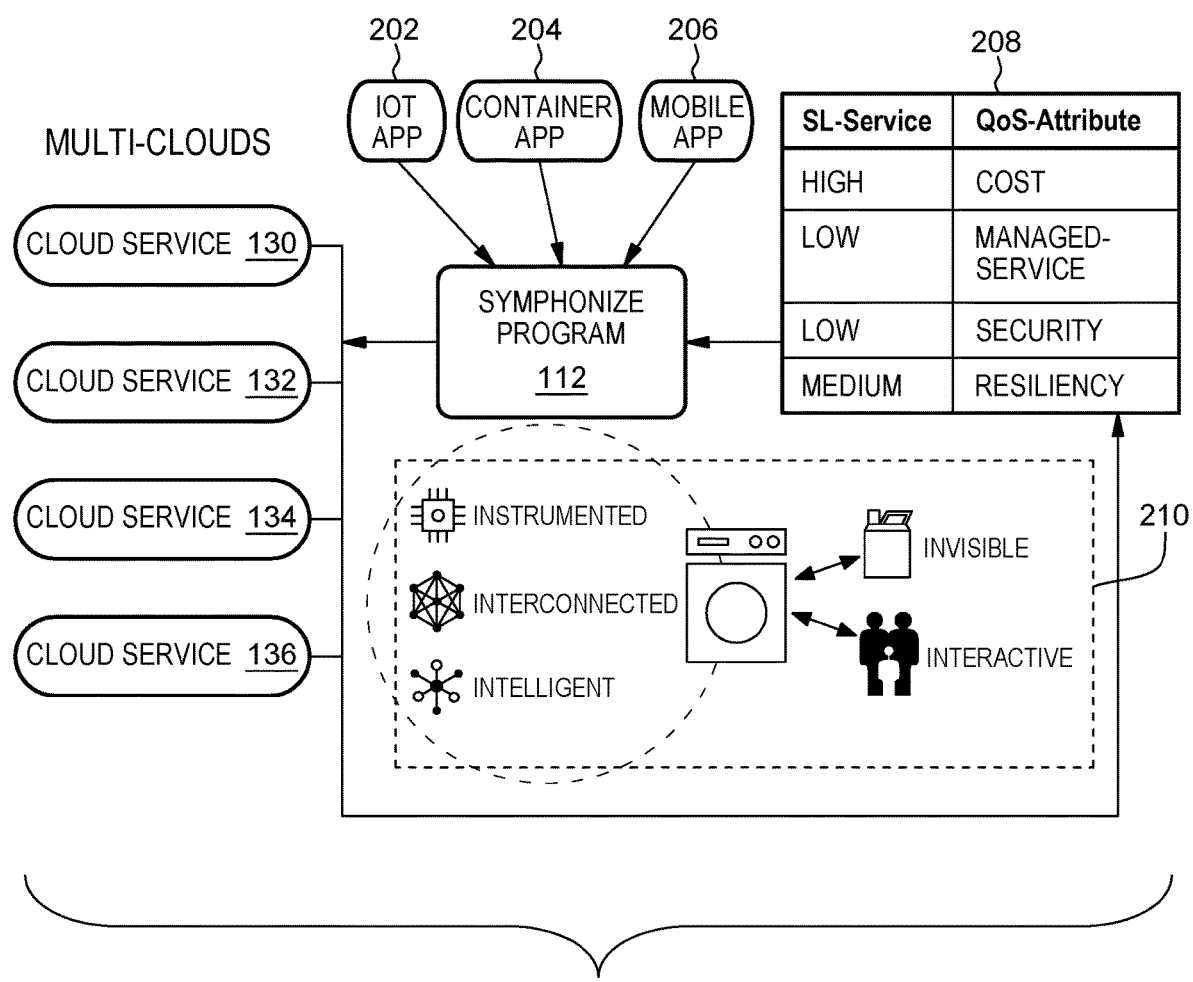
FIG. 4 is an illustration of the operation of the invention, in accordance with an embodiment of the present invention.

FIG. 4 is an illustration of the function of the present invention, in accordance with an embodiment of the invention. The present invention resides in management layer 80 in the functional abstraction layers of FIG. 2. In an embodiment, cloud apps 202, 204, and 206 are applications that are requesting the services from the various cloud service providers, for example, cloud services 130, 132, 134, and 136 from FIG. 3. Mapping table 208 is an example of the mapping of the serverless services (SL-Service Column) to the QoS attributes (QoS Attribute column). Procedure 210 is an illustration of a distributed pre-integrated system that dynamically determines the service QoS and the policy selection during runtime. This procedure will determine the QoS attributes and populate mapping table 208. In this example, when symphonize program 112 receives the requests from cloud apps 202, 204, and 206 for cloud services, symphonize program 112 performs a lookup from mapping table 208 to determine which cloud service provider offers the appropriate QoS attributes for each of the cloud applications. Symphonize program 112 then assigns each of the cloud applications to the appropriate cloud service based on this determination.

Figure 5:
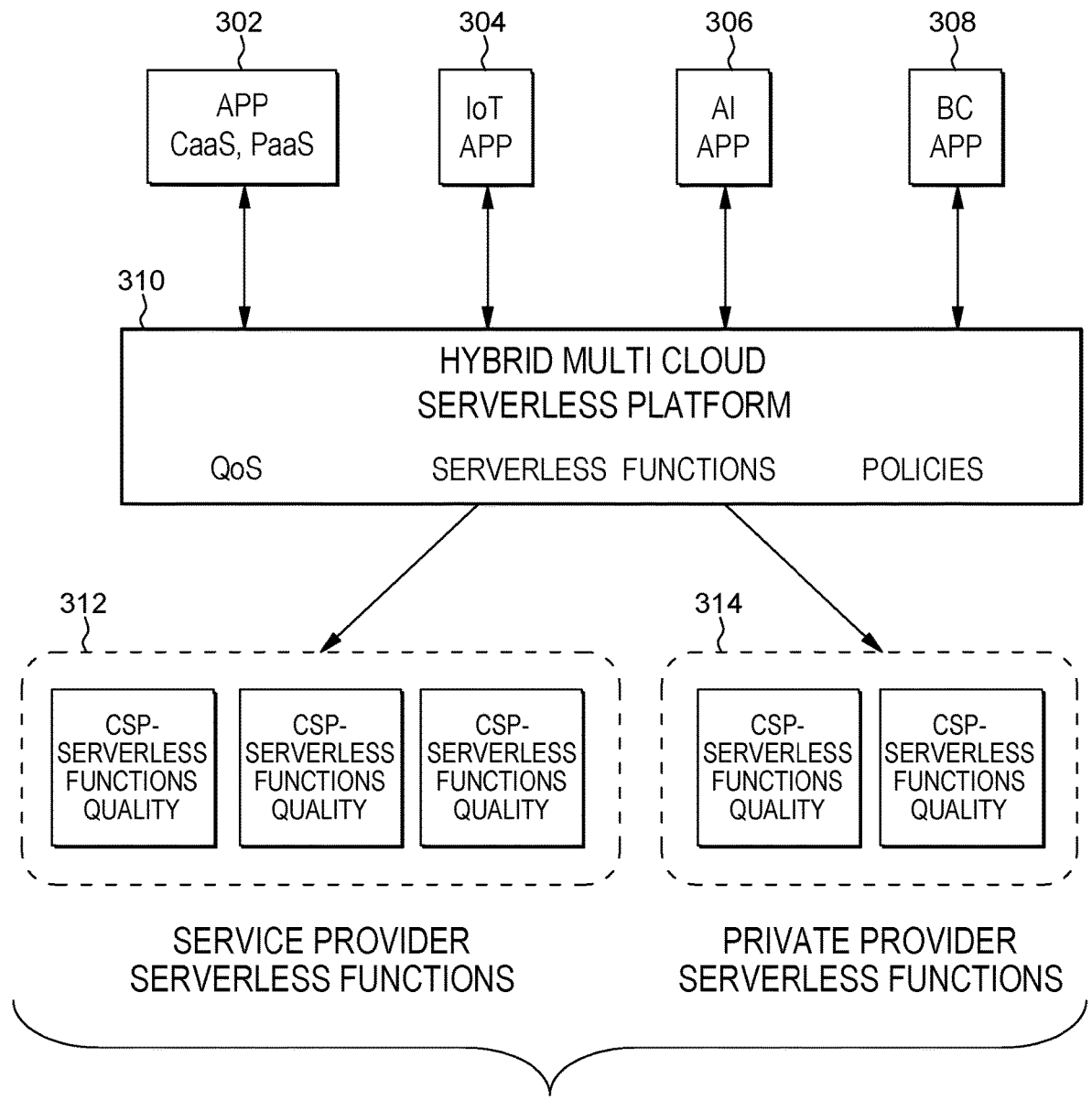
FIG. 5 is an illustration of the selection of the appropriate service provider within the distributed data processing environment of FIG. 3, in accordance with an embodiment of the present invention.

FIG. 5 is an illustration of the selection of the appropriate service provider, in accordance with an embodiment of the invention. In this example, various applications, such as service app 302 (e.g., Containers as a Service (CaaS) or PaaS applications), Internet of Things (IoT) app 304, Artificial Intelligence (AI) app 306, or Block Chain (BC) app 308, enroll with symphonize program 112 for specific serverless functions with specific QoS attributes & policies. In an embodiment, symphonize program 112 validates these attributes across different cloud service providers for each of the applications, performs a lookup into the mapping table, and determines the best service provider 312 or private provider 314 to service each application. Symphonize program 112 then connects each application to the selected service provider or private provider. As the quality attributes are refined, symphonize program 112 seamlessly transitions functions across providers according to the refined quality attributes.

Figure 6:
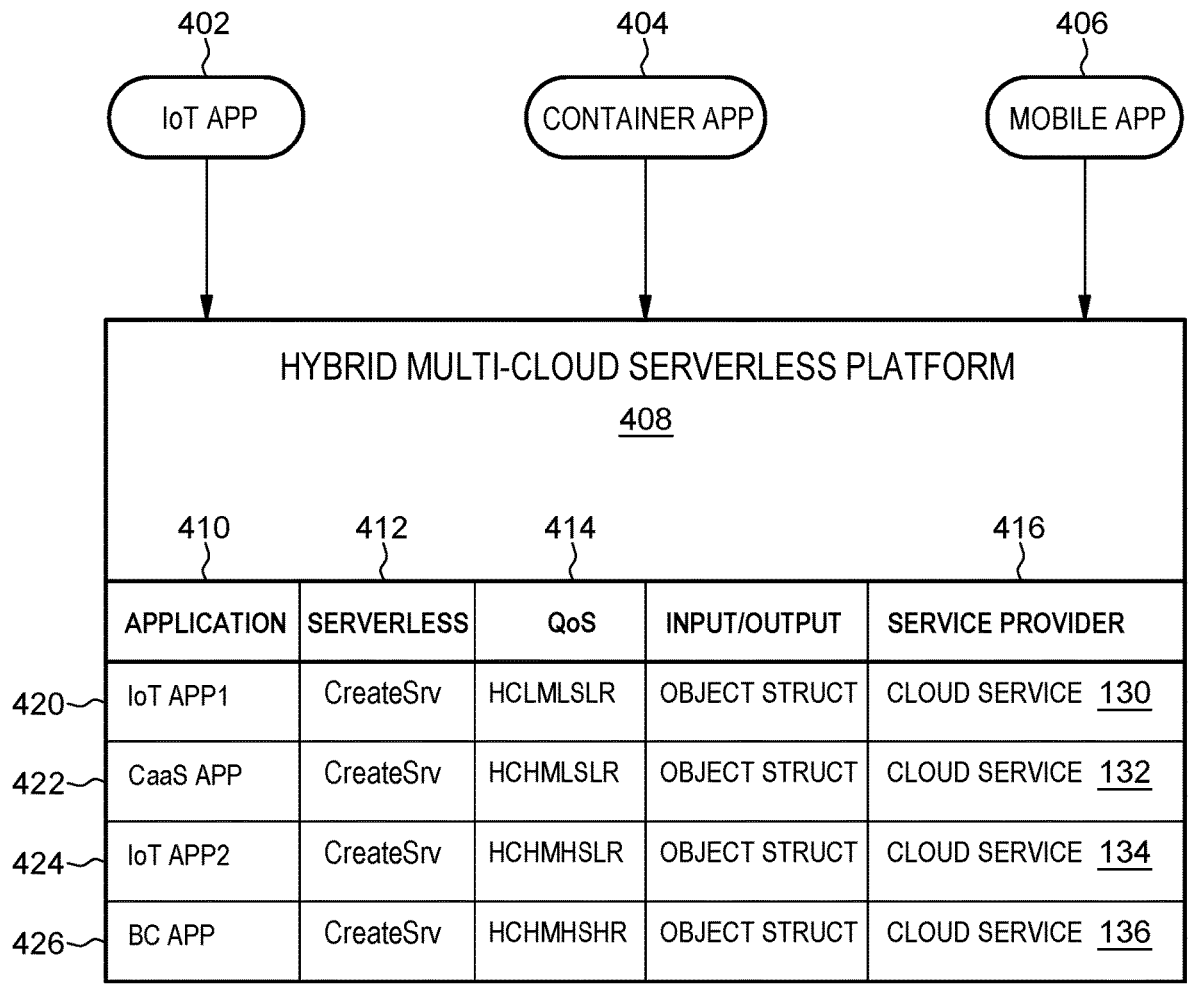
FIG. 6 is an illustration of the mapping of the hybrid cloud applications to the cloud services, in accordance with an embodiment of the present invention.

FIG. 6 is an illustration of the mapping table, in accordance with an embodiment of the invention. In this example, IoT app 402, container app 404, and mobile app 406 have enrolled with symphonize program 112, to access specific serverless functions by providing the defined QoS that is required by each application. Mapping table 408 has previously been populated with QoS attributes and policies for several service providers in service provider column 416, for example, cloud services 130, 132, 134, and 136 from FIG. 3, as well as several applications 410, IoT App1 420, CaaS App 422, IoT App2 424, and BC App 426. Symphonize program 112 determines the appropriate service provider based on the supported quality services as recorded in mapping table 408.

Applications requesting the same functions but with different QoS attributes will be assigned across multiple cloud service providers. For example, multiple applications in FIG. 6 are requesting the same service "CreatSrv," as can be seen in serverless column 412. But each of these applications have different QoS attributes, as can be seen in QoS column 414. For example, the QoS attributes 414 of IoT App1 420 is HCLMLSLR, which in this example means this application is a high cost (HC), low managed (LM), low security (LS), and low resiliency (LR) service. Similarly, the QoS attributes 414 of BC App 426 is HCHMHSHR which in this example is a high cost, highly managed, high security, and high resiliency service. Symphonize program 112, therefore, assigns each of these applications to different service providers, as can be seen in service provider column 416. Therefore, each of these applications will be assigned to different cloud services according to the data in mapping table 408. In this example, IoT App1 420 is assigned to cloud service 130, CaaS App 422 is assigned to cloud service 132, IoT App2 424 is assigned to cloud service 134, and BC App 426 is assigned to cloud service 136, even though each application is requesting the same "CreateSrv" service.

Applications can seamlessly switch to other service providers if those service providers offer the appropriate QoS and policy selections.

Figure 7:
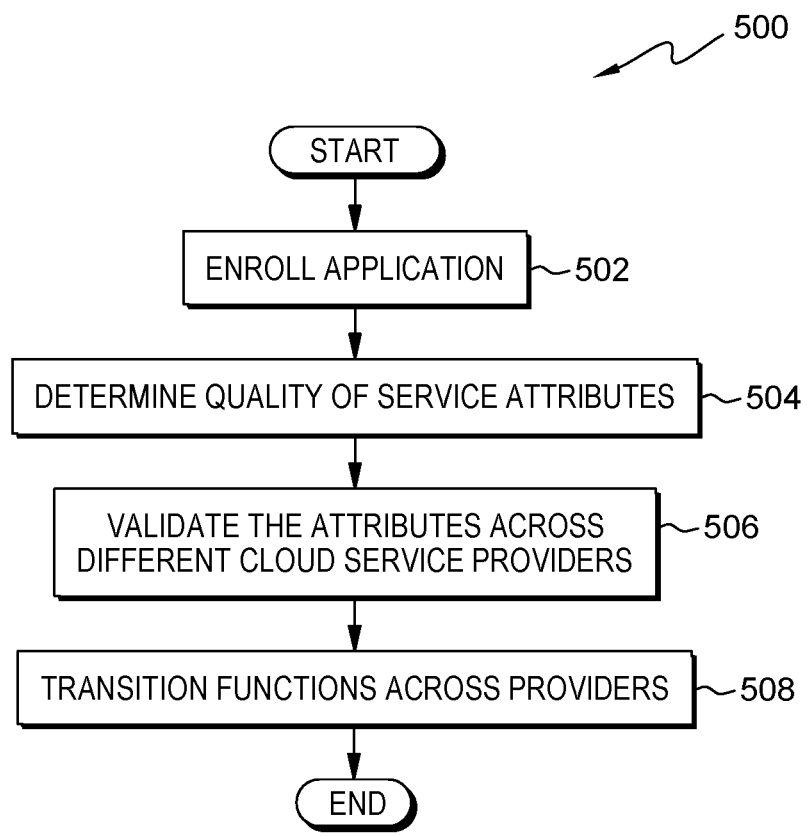
FIG. 7 is a flowchart depicting operational steps for the steps for setting up the serverless functions and QoS attributes performed by the symphonize program, in accordance with an embodiment of the present invention.

FIG. 7 is a flow chart diagram of workflow 500 depicting operational steps for establishing the serverless functions and QoS attributes of symphonize program 112. In an alternative embodiment, the steps of workflow 500 may be performed by any other program while working with symphonize program 112. In an embodiment, symphonize program 112 enrolls the application for specific serverless functions. In an embodiment, symphonize program 112 determines the specific QoS attributes for the new application being enrolled. In an embodiment, symphonize program 112 compares the specific QoS attributes required by the new application with the QoS attributes available for each cloud service provider. In an embodiment, symphonize program 112 connects the application to the selected providers based on the comparison of the QoS attributes required by the application to the QoS attributes provided by the service providers.

It should be appreciated that embodiments of the present invention provide at least for setting up the serverless functions and QoS attributes of symphonize program 112 for defining and symphonizing serverless functions of hybrid multi-cloud services. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 7 illustrates one possible iteration of setting up the serverless functions and QoS attributes of symphonize program 112, which repeats each time a new application enrolls with symphonize program 112.

Symphonize program 112 enrolls an application (step 502). In an embodiment, symphonize program 112 enrolls the application with specific quality of service attributes. In an embodiment, when a client wants to symphonize legacy functions by using multi-cloud serverless components, symphonize program 112 enrolls the application by creating a serverless context according to the required inputs, quality attributes, and supported serverless functions. In an embodiment, symphonize program 112 records the inputs and quality attributes received from the application to be enrolled and enters the quality attributes into the mapping table, e.g., mapping table 408 from FIG. 6.

In an embodiment, symphonize program 112 updates the mapping table, e.g., mapping table 408 from FIG. 6, when new applications enroll; when new service providers enroll; or when existing service providers update their QoS attributes. This allows symphonize program 112 to transition functions across the providers as needed or desired based on the current QoS attributes supported by the service providers.

Symphonize program 112 determines the QoS attributes (step 504). In an embodiment, symphonize program 112 determines the specific QoS attributes for the new application being enrolled. Symphonize program 112 then updates the mapping table, e.g., mapping table 408 from FIG. 6, with the QoS attributes for the application received when the application enrolled for the multi-cloud serverless components in step 502.

Symphonize program 112 validates the attributes across different cloud service providers (step 506). In an embodiment, symphonize program 112 compares the specific QoS attributes required by the new application with the QoS attributes available for each cloud service provider, for example, cloud services 130-136 from FIG. 3.

Symphonize program 112 transitions functions across providers (step 508). In an embodiment, symphonize program 112 transitions functions across the providers based on the comparison of the QoS attributes required by the application to the QoS attributes provided by the service providers in step 506. In an embodiment, symphonize program 112 transitions serverless functions across service providers when the attributes required by the serverless services change. For example, in a first version of the serverless function requires one set of serverless services (e.g., no resiliency, low security, limited managed services), but the next version of that serverless function requires a different set of serverless services (e.g., some resiliency, high security, no managed services), then symphonize program 112 transitions the serverless function to a service provider that meets the new set of serverless services required by the serverless function.

Figure 8:
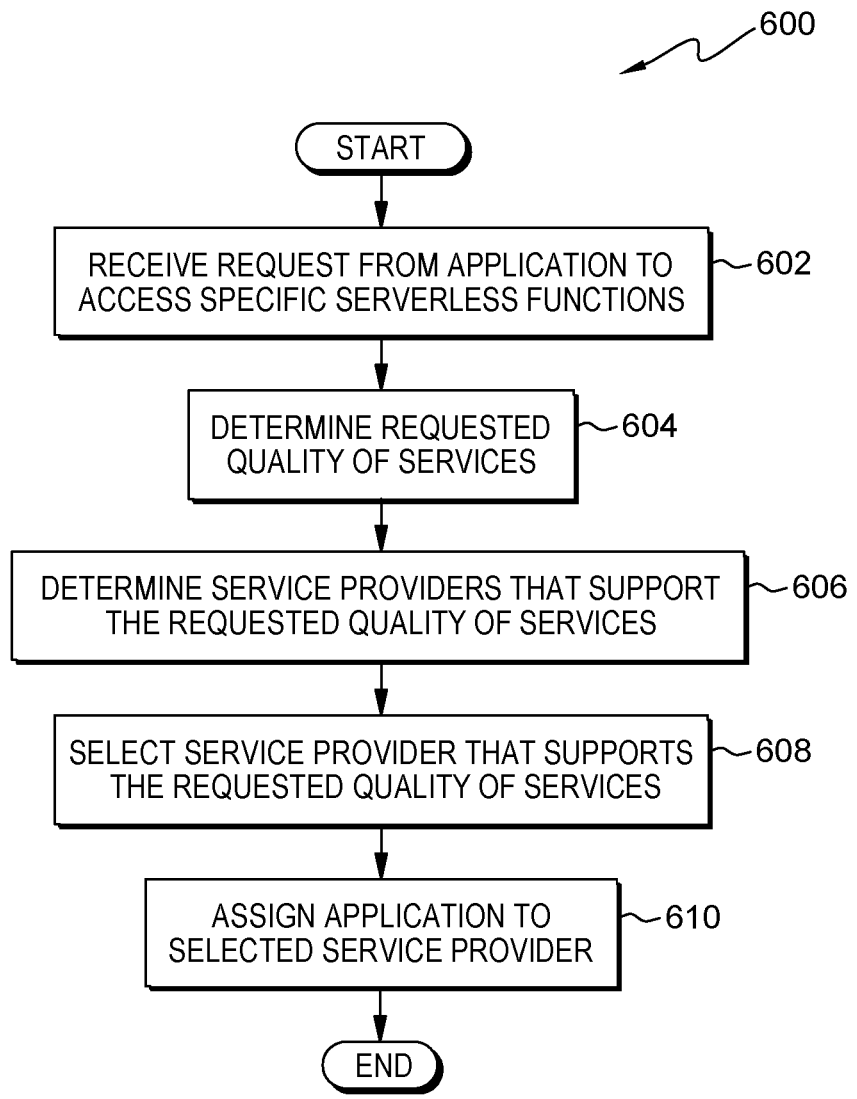
FIG. 8 is a flowchart depicting operational steps for the steps for connecting the applications to the appropriate service providers performed by the symphonize program, in accordance with an embodiment of the present invention.

FIG. 8 is a flow chart diagram of workflow 600 depicting operational steps for connecting the applications to the appropriate service providers performed by symphonize program 112. In an alternative embodiment, the steps of workflow 600 may be performed by any other program while working with symphonize program 112. In an embodiment, symphonize program 112 receives a request from an application to access specific serverless functions that provide the defined QoS. In an embodiment, symphonize program 112 determines the specific QoS attributes that are being requested by the application being serviced. In an embodiment, symphonize program 112 determines the service providers that can provide the QoS attributes requested by the application being serviced. In an embodiment, symphonize program 112 selects a service provider that can provide the QoS attributes requested by the application being serviced. In an embodiment, symphonize program 112 connects the application to the selected service provider.

It should be appreciated that embodiments of the present invention provide at least for connecting the applications to the appropriate service providers performed by symphonize program 112 for defining and symphonizing serverless functions of hybrid multi-cloud services. However, FIG. 8 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 8 is illustrates one possible iteration of the operational steps for establishing the serverless functions and QoS attributes of symphonize program 112, which repeats each time symphonize program 112 receives a request from an application to access specific serverless functions.

Symphonize program 112 receives a request from an application to access specific serverless functions (step 602). In an embodiment, symphonize program 112 receives a request from an application to access specific serverless functions that provide the defined QoS.

Symphonize program 112 determines the requested QoS (step 604). In an embodiment, symphonize program 112 determines the specific QoS attributes that are being requested by the application being serviced.

Symphonize program 112 determines the service providers that support the requested QoS (step 606). In an embodiment, symphonize program 112 determines the service providers that can provide the QoS attributes requested by the application being serviced by comparing the QoS attributes determined in step 604 to the QoS attributes for the serverless services in the mapping table, e.g., mapping table 408 from FIG. 6. In an embodiment, symphonize program 112 scans the mapping table to determine all the service providers that can provide the specific serverless services and meet the QoS attributes requested by the application being serviced.

Symphonize program 112 selects the service provider that supports the requested QoS (step 608). In an embodiment, symphonize program 112 selects a service provider that can provide the serverless functions that meet the QoS attributes requested by the application being serviced. In an embodiment, symphonize program 112 selects a service provider based on a priority list of service providers received from the client. In another embodiment, symphonize program 112 selects a service provider based on a least recently used algorithm to evenly distribute the selections between all the service providers that can provide the serverless functions that meet the QoS attributes requested by the application. In yet another embodiment, symphonize program 112 selects a service provider randomly from the list of service providers that can provide the serverless functions that meet the QoS attributes requested by the application.

Symphonize program 112 assigns the application to the selected service provider (step 610). In an embodiment, symphonize program 112 binds the application to the serverless services provided by the service provider selected in step 608.

Figure 9:
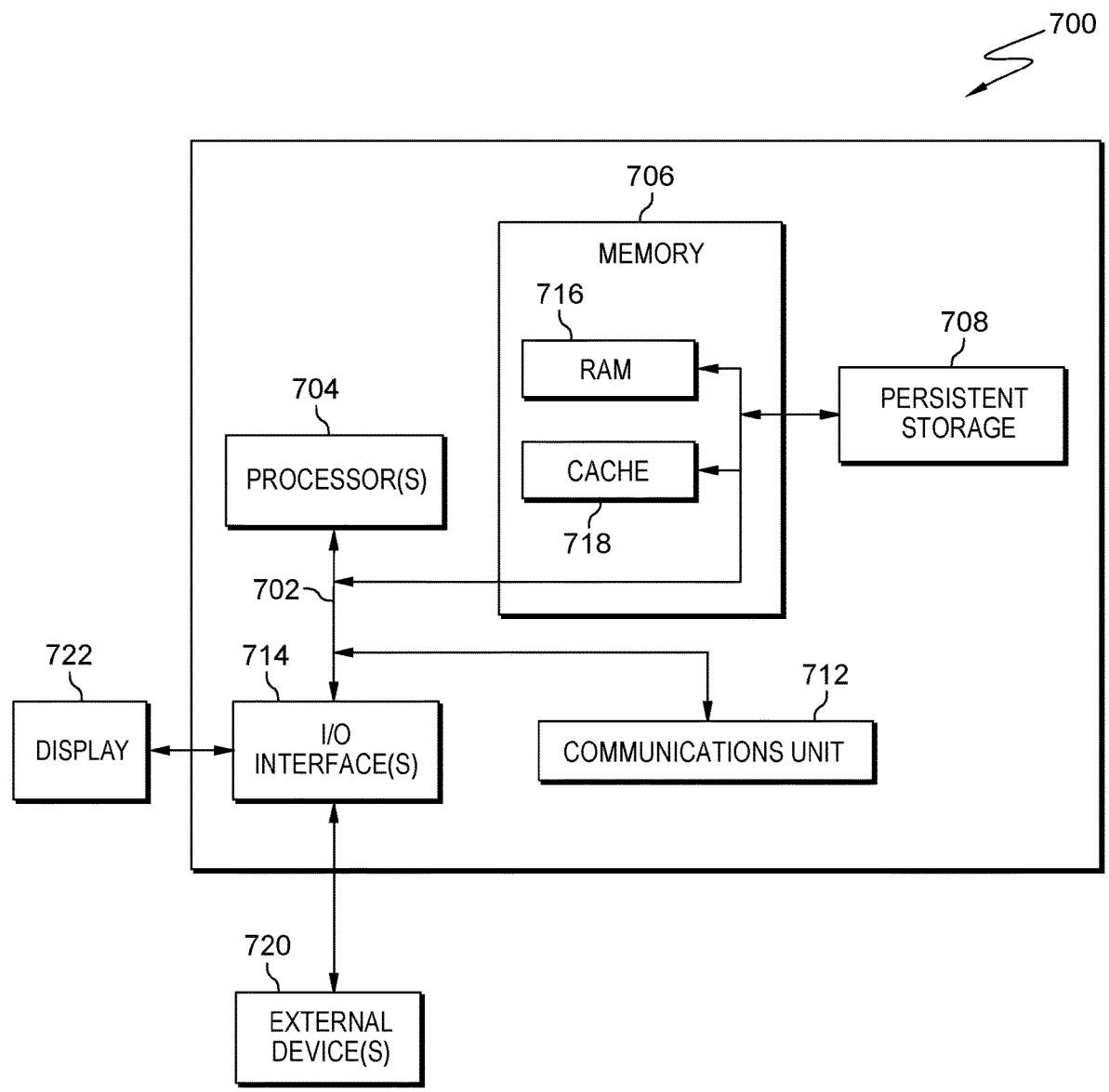
FIG. 9 depicts a block diagram of components of the computing devices executing the symphonize program within the distributed data processing environment of FIG. 3, in accordance with an embodiment of the present invention.

FIG. 9 is a block diagram depicting components of computing device 110 suitable for symphonize program 112, in accordance with at least one embodiment of the invention. FIG. 9 displays the computer 700, one or more processor(s) 704 (including one or more computer processors), a communications fabric 702, a memory 706 including, a random-access memory (RAM) 716, and a cache 718, a persistent storage 708, a communications unit 712, I/O interfaces 714, a display 722, and external devices 720. It should be appreciated that FIG. 9 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and input/output (I/O) interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a RAM 716 and a cache 718. In general, the memory 706 can include any suitable volatile or non-volatile computer readable storage media. Cache 718 is a fast memory that enhances the performance of processor(s) 704 by holding recently accessed data, and near recently accessed data, from RAM 716.

Program instructions for symphonize program 112 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., symphonize program 112, can be stored on such portable computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for symphonizing serverless functions, the computer-implemented method comprising:

creating, by one or more computer processors, a mapping table, wherein the mapping table contains a quality of service (QoS) attributes for one or more applications and one or more service providers;

responsive to receiving a request from a runtime application to access one or more specific serverless functions, determining, by the one or more computer processors, a specific QoS attributes for the runtime application, wherein the QoS attributes include at least one of cost, managed service, security, and resiliency;

determining, by the one or more computer processors, one or more supporting service providers that provide the one or more specific serverless functions and the specific QoS attributes for the runtime application;

selecting, by the one or more computer processors, a supporting service provider of the one or more supporting service providers based on a received priority list from a client of the one or more service providers that support the specific QoS attributes for the runtime application;

binding, by the one or more computer processors, the one or more specific serverless functions for the runtime application to the supporting service provider of the one or more supporting service providers; and responsive to the specific QoS attributes for the runtime application of the one or more specific serverless functions changing, seamlessly transitioning, by the one or more computer processors, the one or more specific serverless functions to a new supporting service provider which supports the changed specific QoS attributes for the runtime application of the one or more specific serverless functions.

2. The computer-implemented method of claim 1, wherein creating, by the one or more computer processors, the mapping table further comprises:

responsive to receiving the request to enroll a new service provider for the one or more serverless functions, determining, by the one or more computer processors, the QoS attributes for the new service provider;

recording, by the one or more computer processors, the QoS attributes for the new service provider into the mapping table;

responsive to receiving the request to enroll a new application for one or more serverless functions, determining, by the one or more computer processors, the QoS attributes for the new application; and populating, by the one or more computer processors, the QoS attributes for the new application into the mapping table.

3. The computer-implemented method of claim 1, wherein the specific QoS attributes for the runtime application further comprises one or more runtime policies for the runtime application.

4. The computer-implemented method of claim 1, wherein the one or more service providers comprises one or more public service providers.

5. The computer-implemented method of claim 1, wherein the one or more service providers comprises one or more private service providers.

6. The computer-implemented method of claim 1, wherein the one or more service providers comprises one or more public service providers and one or more private service providers.

7. A computer program product for symphonizing serverless functions, the computer program product comprising one or more computer readable storage media and program instructions stored on the one or more computer readable storage media, the program instructions including instructions to:
create a mapping table, wherein the mapping table contains a quality of service (QoS) attributes for one or more applications and one or more service providers;
responsive to receiving a request from a runtime application to access one or more specific serverless functions, determine a specific QoS attributes for the runtime application, wherein the QoS attributes include at least one of cost, managed service, security, and resiliency;
determine one or more supporting service providers that provide the one or more specific serverless functions and the specific QoS attributes for the runtime application;
select a supporting service provider of the one or more supporting service providers based on a received priority list from a client of the one or more service providers that support the specific QoS attributes for the runtime application;
bind the one or more specific serverless functions for the runtime application to the supporting service provider of the one or more supporting service providers; and
responsive to the specific QoS attributes for the runtime application of the one or more specific serverless functions changing, seamlessly transition the one or more specific serverless functions to a new supporting service provider which supports the changed specific QoS attributes for the runtime application of the one or more specific serverless functions.

8. The computer program product of claim 7, wherein creating the mapping table further comprises one or more of the following program instructions, stored on the one or more computer readable storage media, to:
responsive to receiving the request to enroll a new service provider for the one or more serverless functions, determine the QoS attributes for the new service provider;
enter the QoS attributes for the new service provider into the mapping table;
responsive to receiving the request to enroll a new application for one or more serverless functions, determine the QoS attributes for the new application; and
populate the QoS attributes for the new application into the mapping table.

9. The computer program product of claim 8, wherein the specific QoS attributes for the runtime application further comprises one or more runtime policies for the runtime application.

10. The computer program product of claim 8, wherein the one or more service providers comprises one or more public service providers.

11. The computer program product of claim 8, wherein the one or more service providers comprises one or more private service providers.

12. The computer program product of claim 8, wherein the one or more service providers comprises one or more public service providers and one or more private service providers.

13. A computer system for symphonizing serverless functions, the computer system comprising:
one or more computer processors;
one or more computer readable storage media; and
program instructions stored on the one or more computer readable storage media for execution by at least one of the one or more computer processors, the stored program instructions including instructions to:
create a mapping table, wherein the mapping table contains a quality of service (QoS) attributes for one or more applications and one or more service providers;
responsive to receiving a request from a runtime application to access one or more specific serverless functions, determine a specific QoS attributes for the runtime application, wherein the QoS attributes include at least one of cost, managed service, security, and resiliency;
determine one or more supporting service providers that provide the one or more specific serverless functions and the specific QoS attributes for the runtime application;
select a supporting service provider of the one or more supporting service providers based on a received priority list from a client of the one or more service providers that support the specific QoS attributes for the runtime application;
bind the one or more specific serverless functions for the runtime application to the supporting service provider of the one or more supporting service providers; and
responsive to the specific QoS attributes of the one or more specific serverless functions changing, seamlessly transition the one or more specific serverless functions to a new supporting service provider which supports the changed specific QoS attributes for the runtime application of the one or more specific serverless functions.

14. The computer system of claim 13, wherein creating the mapping table further comprises one or more of the following program instructions, stored on the one or more computer readable storage media, to:
responsive to receiving the request to enroll a new service provider for the one or more serverless functions, determine the QoS attributes for the new service provider;
enter the QoS attributes for the new service provider into the mapping table;
responsive to receiving the request to enroll a new application for one or more serverless functions, determine the QoS attributes for the new application; and
populate the QoS attributes for the new application into the mapping table.

15. The computer system of claim 13, wherein the specific QoS attributes for the runtime application further comprises one or more runtime policies for the runtime application.

16. The computer system of claim 13, wherein the one or more service providers comprises one or more public service providers.

17. The computer system of claim 13, wherein the one or more service providers comprises one or more private service providers.

* * * * *